: US011237002B2

United States Patent
Iwata et al.

(10) Patent No.: US 11,237,002 B2
(45) Date of Patent: Feb. 1, 2022

(54) SERVER DEVICE, COMMUNICATION TERMINAL, ROUTE RETRIEVAL SYSTEM, AND COMPUTER PROGRAM

(71) Applicants: AISIN CORPORATION, Kariya (JP); TOYOTA JIDOSHA KABUSHIKI KAISHA, Toyota (JP)

(72) Inventors: Tominori Iwata, Nagoya (JP); Daisuke Tanizaki, Okazaki (JP); Koichi Iwatsuki, Okazaki (JP); Toyoji Hiyokawa, Okazaki (JP); Kenji Nagase, Okazaki (JP); Motohiro Nakamura, Okazaki (JP); Kazunori Watanabe, Okazaki (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 16/080,523

(22) PCT Filed: Mar. 23, 2017

(86) PCT No.: PCT/JP2017/011779
§ 371 (c)(1),
(2) Date: Aug. 28, 2018

(87) PCT Pub. No.: WO2017/170141
PCT Pub. Date: Oct. 5, 2017

(65) Prior Publication Data
US 2019/0011265 A1   Jan. 10, 2019

(30) Foreign Application Priority Data
Mar. 28, 2016 (JP) .............................. JP2016-064274

(51) Int. Cl.
*G01C 21/20* (2006.01)
*G09B 29/00* (2006.01)
(Continued)

(52) U.S. Cl.
CPC ......... *G01C 21/20* (2013.01); *G01C 21/3446* (2013.01); *G01C 21/36* (2013.01);
(Continued)

(58) Field of Classification Search
CPC ...................................... G01C 21/20
(Continued)

(56) References Cited

U.S. PATENT DOCUMENTS 9,141,107 B2 * 9/2015 Ferguson ........... G06K 9/00818
9,171,464 B2 * 10/2015 Khetan ................... G06T 17/05
(Continued)

FOREIGN PATENT DOCUMENTS

EP    0 845 658 A2   6/1998
JP    2003-097960 A   4/2003
(Continued)

OTHER PUBLICATIONS

JPO Translation of Japanese Patent Application Pub. No. JP 2011-047750 A to Hagino et al.*
(Continued)

*Primary Examiner* — Jean Paul Cass
(74) *Attorney, Agent, or Firm* — Oliff PLC

(57) ABSTRACT

A server is connected to a communication terminal and configured to receive a departure point, a destination, and a route retrieval request from the departure point to the destination from the terminal and to deliver a route retrieved in response to the received route retrieval request to the terminal. When the route retrieval request is acquired from the terminal, the server acquires route information related to a target route that is a route corresponding to a predeter-
(Continued)

mined distance from the departure point in a terminal-recommended route that is a route from the departure point to the destination and is retrieved by using terminal-side map information provided in the terminal. The server retrieves a route to the destination that includes at least a part of the target route by using device-side map information provided in the server and the route information, and delivers the retrieved route to the terminal.

12 Claims, 9 Drawing Sheets

(51) Int. Cl.
*G08G 1/0968* (2006.01)
*G01C 21/34* (2006.01)
*H04W 4/024* (2018.01)
*G01C 21/36* (2006.01)

(52) U.S. Cl.
CPC ....... *G08G 1/096816* (2013.01); *G09B 29/00* (2013.01); *H04W 4/024* (2018.02); *G08G 1/096827* (2013.01)

(58) Field of Classification Search
USPC .......................................................... 701/420
See application file for complete search history.

(56) References Cited

U.S. PATENT DOCUMENTS

| | | | | |
|---|---|---|---|---|
| 10,232,856 B2* | 3/2019 | Khalifeh | ................. | H04W 4/80 |
| 10,642,267 B2* | 5/2020 | Agarwal | ............... | B60W 50/14 |
| 2010/0198500 A1 | 8/2010 | Sengoku et al. | | |
| 2011/0098915 A1* | 4/2011 | Disatnik | ............ | G01C 21/3415 |
| | | | | 701/533 |
| 2013/0131980 A1* | 5/2013 | Ginsberg | ................ | G01C 21/30 |
| | | | | 701/446 |
| 2013/0339415 A1* | 12/2013 | Krogh | ..................... | G01S 19/47 |
| | | | | 708/316 |
| 2014/0266160 A1* | 9/2014 | Coza | ........................ | G01V 3/08 |
| | | | | 324/207.11 |
| 2014/0278206 A1* | 9/2014 | Girod | ................... | G01C 21/165 |
| | | | | 702/141 |
| 2016/0173409 A1* | 6/2016 | Bragstad | ................. | H04L 47/78 |
| | | | | 709/226 |
| 2018/0156623 A1* | 6/2018 | West | .................. | G01C 21/3423 |

FOREIGN PATENT DOCUMENTS

| | | |
|---|---|---|
| JP | 2009-019924 A | 1/2009 |
| JP | 2010-210332 A | 9/2010 |
| JP | 2010-223648 A | 10/2010 |
| JP | 2011-47750 A | 3/2011 |

OTHER PUBLICATIONS

JPO Machine translation of Japanese Patent Application Pub. No. JP,2010-210332,A to Ono et al. (hereinafter "Ono").*
JPO machine Translation of of Japanese Patent Application Pub. No. JP,2010-223648,A (hereinafter the 648 publication).*
Jun. 20, 2017 International Search Report issued in International Patent Application PCT/JP2017/011779.
Nov. 2, 2018 Supplementary Search Report issued in European Application No. 17774679.9.

* cited by examiner

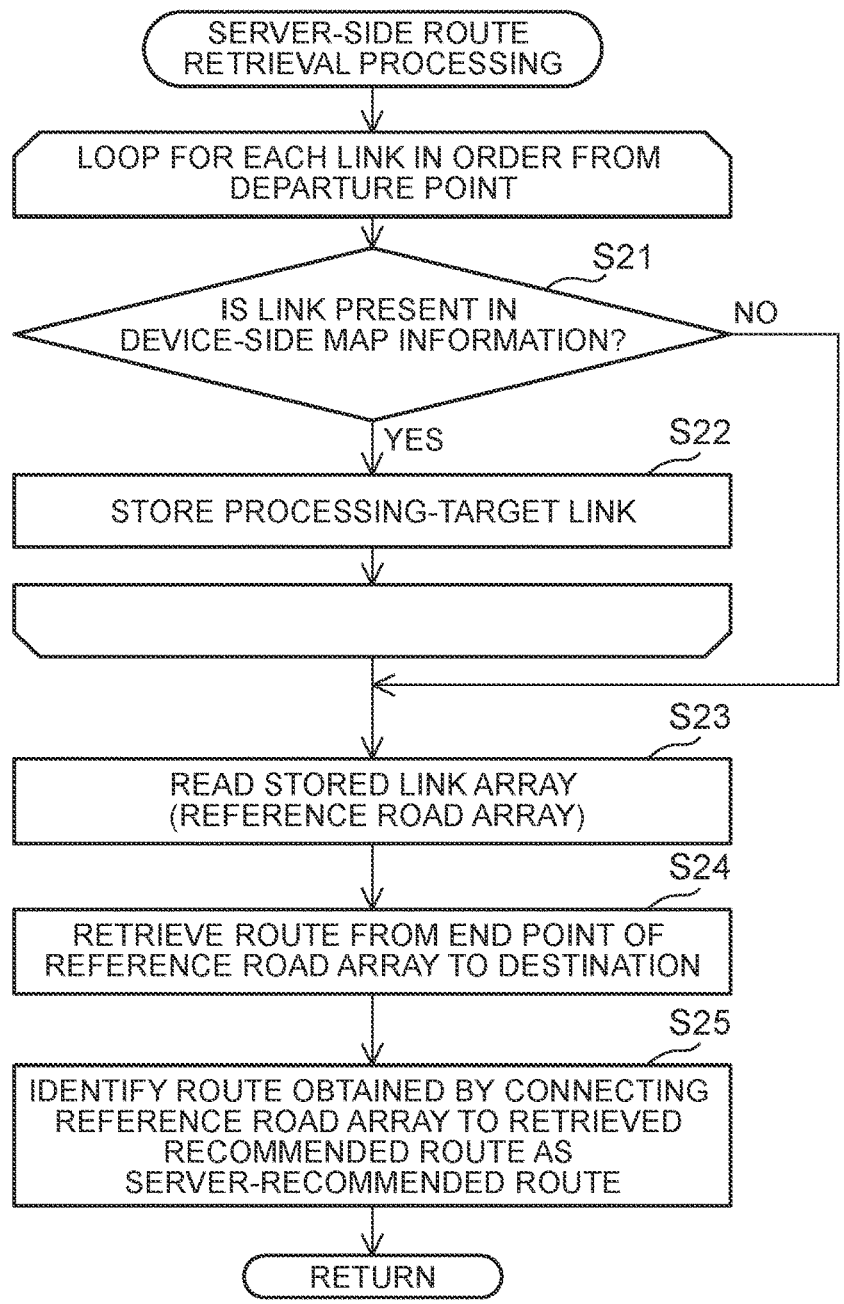
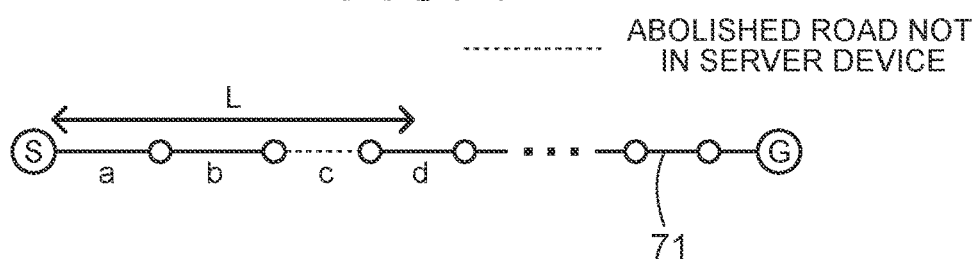

SERVER DEVICE, COMMUNICATION TERMINAL, ROUTE RETRIEVAL SYSTEM, AND COMPUTER PROGRAM

TECHNICAL FIELD

Related technical fields include server devices, communication terminals, route retrieval systems, and computer programs that are configured to retrieve a guidance route to be used for providing travel guidance for a moving object.

BACKGROUND

In recent years, there are many vehicles equipped with navigation devices configured to provide travel guidance for the vehicles so as to allow drivers to easily arrive at desired destinations. The navigation device is a device capable of detecting a current position of a vehicle by using a GPS receiver or the like, acquiring map information corresponding to the current position from a recording medium such as a DVD-ROM or an HDD or through a network, and displaying the map information on a liquid crystal monitor. The navigation device has a route retrieval function for retrieving, when a desired destination is set, an optimum route from a departure point (for example, a current position of the vehicle) to the set destination, and also has a travel guidance function for providing guidance on travel in accordance with the retrieved route (guidance route). In recent years, mobile phones, personal digital assistants (PDAs), smartphones, personal computers, or the like may have functions similar to those of the navigation device (hereinafter referred to as communication terminals including the navigation device).

In Japan, new roads (newly-built roads) are constructed nationwide every year. Along with the construction, existing roads are abolished, intersections are added, or the shapes of existing roads or intersections are changed. At this time, there is a problem in that information related to a newly-built road or the like that is newly constructed after map information provided in a communication terminal is created is not registered in the map information. That is, in a communication terminal having map information that does not include a newly-built road or the like, the newly-built road or the like is not selected in the route retrieval or guidance. Therefore, there are cases where appropriate travel guidance is not provided as in a case where a longer guidance route that does not follow the newly-built road or the like is retrieved or in a case where guidance on real roads or intersections is not provided in a map image.

In recent years, there is a proposal for a configuration in which the route retrieval is not executed on the communication terminal side hut is executed by an external server device having the latest map information to acquire a guidance route from the server device (hereinafter referred to as center route retrieval). When the center route retrieval is executed, however, a route can be retrieved based on the latest map information, but the communication terminal and the server device need to communicate with each other a predetermined number of times until a guidance route is set. Therefore, a longer time is necessary until a guidance route is set than the case where the communication terminal executes the route retrieval. As a result, there is a problem in that travel guidance cannot be provided based on the guidance route for a certain length of time after a route retrieval request is given.

Japanese Patent Application Publication No. 2009-19924 (JP 2009-19924 A) proposes a technology in which, when the center route retrieval is executed, route retrieval is executed on the navigation device side in addition to the server device and a guidance route is set by using a route retrieved on the navigation device side (hereinafter referred to as a local route) within a range of a predetermined distance from the current position. JP 2009-19924 A also discusses that, when the navigation device receives a route retrieved through the center route retrieval (hereinafter referred to as a center route) and when a location that is a predetermined distance away from the current position of the vehicle along the local route is not present on the center route, a route connecting that location to the center route (hereinafter referred to as a connection route) is further retrieved and a route obtained by connecting the three routes that are the local route, the connection route, and the center route is set as a guidance route.

SUMMARY

In JP 2009-19924 A, the center route is a route to a destination from a current position of the vehicle at the time when the navigation device gives a route retrieval request to the server device. That is, the center route is determined without considering travel of the vehicle from the time when the route retrieval request is given to the server device to the time when the center route is received.

Thus, when the travel route of the vehicle after the route retrieval request is given to the server device follows the center route, the center route may be a recommended route of the vehicle. When the travel route of the vehicle after the route retrieval request is given to the server device follows a route different from the center route (that is, when the position of the vehicle at the time when the center route is received is not present on the center route), the center route is not necessarily a currently recommended route of the vehicle.

For example, when the position of the vehicle at the time when the route retrieval request is given to the server device is a location X as illustrated in FIG. 13, a recommended route 101 from the location X to the destination is retrieved as a center route, and is delivered to the navigation device. When the vehicle travels along a route different from the center route after the route retrieval request is given and is located at a location Y at the time when the center route is received, however, a route 102 from the location Y to the destination is more recommended than the recommended route 101.

In JP 2009-19924 A, however, a route that forcibly leads to the recommended route 101 that is the center route instead of the route 102 is set as a guidance route by retrieving a connection route as described above. Therefore, there is a problem in that a route other than the currently most recommended route of the vehicle is set as the guidance route.

Exemplary embodiments of the broad inventive principles described herein solve the problem inherent in the related art, and have an object to provide a server device, a communication terminal, a route retrieval system, and a computer program that are capable of setting a currently optimum guidance route for a moving object (such as a vehicle equipped with the communication terminal or a user who carries the communication terminal) because a center route can be retrieved also in consideration of movement of the moving object after a route retrieval request is given to the server device.

Exemplary embodiments provide a server device (and a computer program therefor) that is connected to a communication terminal in a bidirectionally communicable manner and configured to receive a departure point, a destination, and a route retrieval request from the departure point to the destination from the communication terminal and to deliver a route retrieved in response to the received route retrieval request to the communication terminal. When the route retrieval request is acquired from the communication terminal, the server device acquires route information related to a target route that is a route corresponding to a predetermined distance from the departure point in a terminal-recommended route that is a route from the departure point to the destination and is retrieved by using terminal-side map information provided in the communication terminal. The server device retrieves a route to the destination that includes at least a part of the target route by using device-side map information provided in the server device and the route information, and delivers the retrieved route to the communication terminal.

The "route information related to the target route" includes information related to a location that may identify the target route, such as a start point or an end point of the target route, in addition to information for identifying a specific shape of the target route, such as a road array (link array) or a coordinate array of the target route.

The "route including at least a part of the target route" includes a route including a partial segment of the target route or a location on the target route in addition to a route including the entire target route.

The "retrieval of the route to the destination" includes formation of a route to the destination through connection of a plurality of routes in addition to selection of an optimum route from among a plurality of route candidates using cost values.

Exemplary embodiments provide a communication terminal (and a computer program therefor) that is connected to a server device in a bidirectionally communicable manner and configured to transmit a departure point, a destination, and a route retrieval request from the departure point to the destination to the server device and to acquire a route that is retrieved and delivered by the server device in response to the route retrieval request. The communication terminal retrieves a route from the departure point to the destination by using terminal-side map information provided in the communication terminal and transmits, to the server device, the route retrieval request and route information related to a target route that is a route corresponding to a predetermined distance from the departure point in a terminal-recommended route that is the retrieved route. The communication terminal receives, from the server device, a route to the destination that includes at least a part of the target route and is retrieved by the server device in response to the route retrieval request by using device-side map information provided in the server device and the route information.

Exemplary embodiments provide a route retrieval system including the server device and the communication terminal.

According to the server device, the communication terminal, the route retrieval system, and the computer program having the configurations described above, when center route retrieval is executed, a center route is set so as to include the route within the predetermined distance from the departure point in the recommended route retrieved by the communication terminal, that is, a route Where the moving object (such as a vehicle equipped with the communication terminal or a user who carries the communication terminal) presumably travels after the route retrieval request is transmitted to the server device. Therefore, the center route can be retrieved also in consideration of the movement of the moving object after the route retrieval request is given to the server device. As a result, a currently optimum guidance route can be set for the moving object.

BRIEF DESCRIPTION OF THE DRAWINGS

FIG. 6 is a flowchart of a subordinate processing program of server-side route retrieval processing.

FIG. 7 is a diagram illustrating a reference road array.

DETAILED DESCRIPTION OF EXEMPLARY EMBODIMENT

A first embodiment to a third embodiment that implement a server device, a communication terminal, a route retrieval system, and a computer program according to the present invention are described below in detail with reference to the drawings.

First Embodiment

Figure 1:
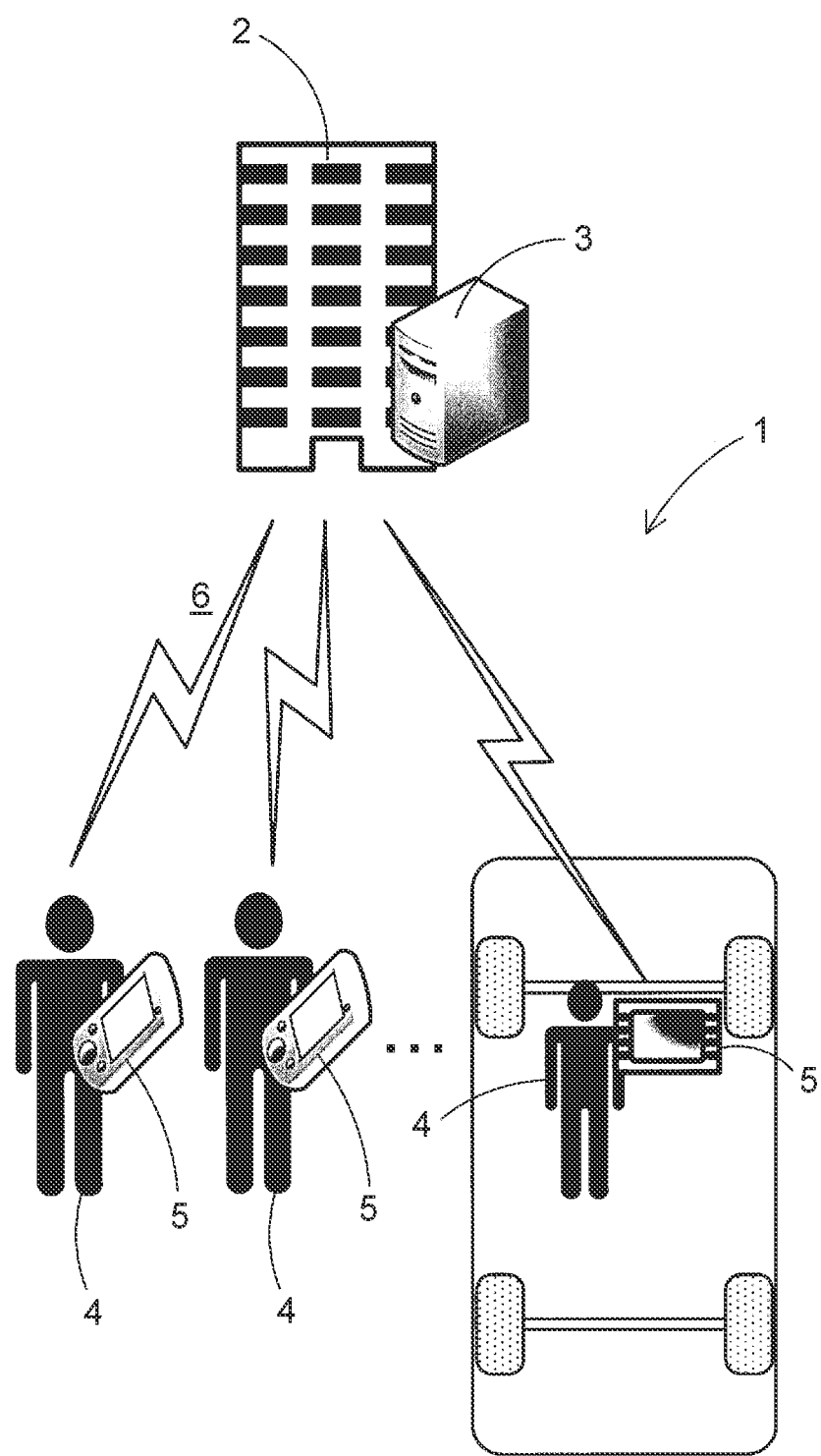
FIG. 1 is a schematic configuration diagram illustrating a route retrieval system according to a first embodiment.
Figure 2:
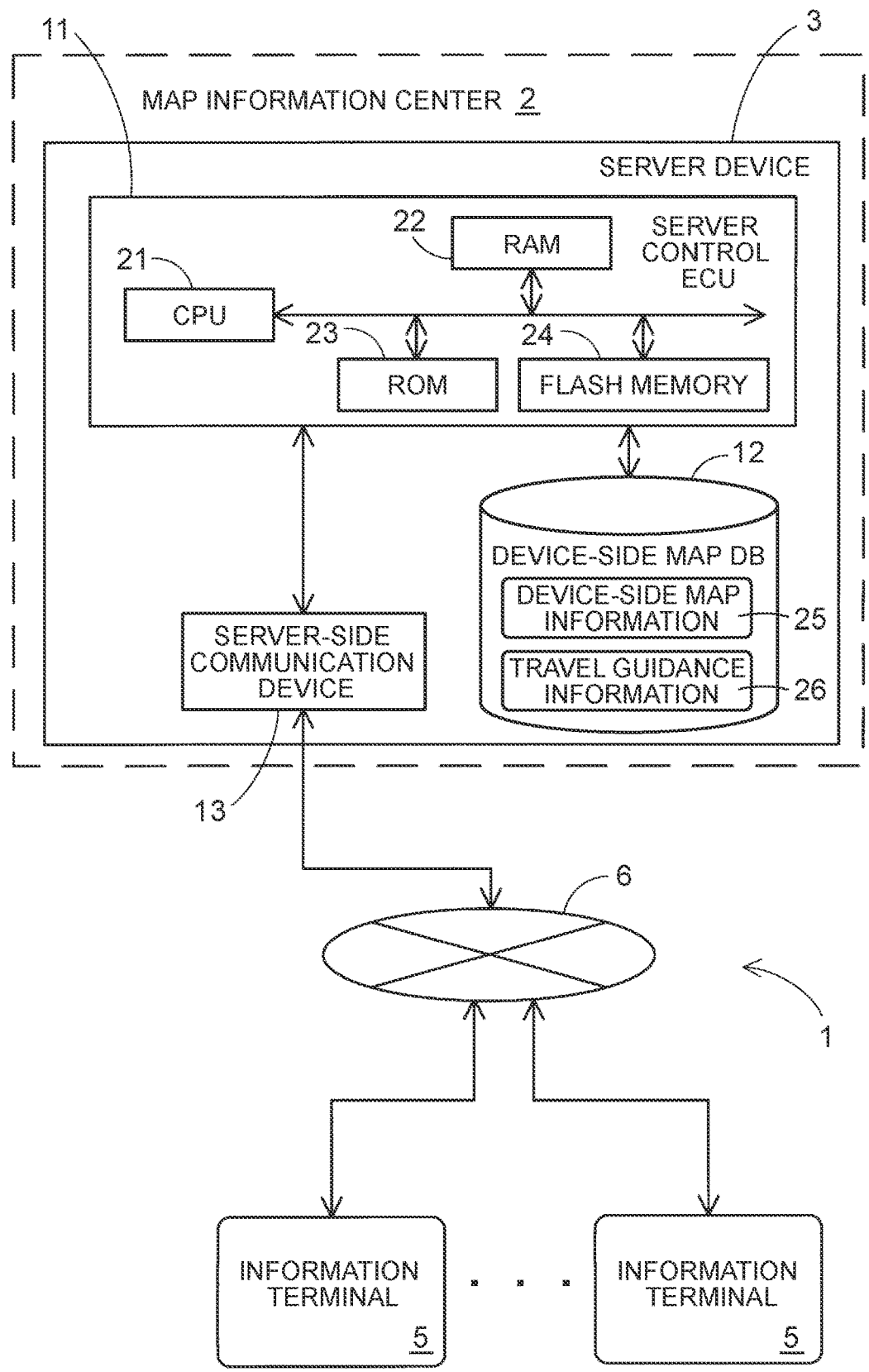
FIG. 2 is a block diagram illustrating the configuration of the route retrieval system according to the first embodiment.

First, the schematic configuration of a route retrieval system 1 according to the first embodiment is described with reference to FIG. 1 and FIG. 2. FIG. 1 is a schematic configuration diagram illustrating the route retrieval system 1 according to the first embodiment. FIG. 2 is a block diagram illustrating the configuration of the route retrieval system 1 according to the first embodiment.

As illustrated in FIG. 1, the route retrieval system 1 according to the first embodiment basically includes a server device 3 provided in a map information center 2, and communication terminals 5 possessed by users 4. The server device 3 and the communication terminal 5 are configured to transmit and receive electronic data therebetween via a communication network 6. Examples of the communication terminal 5 include a mobile phone, a smartphone, a tablet terminal, a personal computer, and a navigation device. The user 4 may ride in a vehicle but need not ride in a vehicle.

The server device 3 executes route retrieval in response to a request from the communication terminal 5. Specifically, when a destination is set in the communication terminal 5 or when route retrieval is executed again (rerouting), information necessary for route retrieval, such as a departure point and the destination, is transmitted from the communication terminal 5 to the server device 3 together with the route retrieval request (when route retrieval is executed again, the information related to the destination is not transmitted necessarily). The server device 3 that receives the route retrieval request executes the route retrieval by using map information provided in the server device 3 to identify a recommended route from the departure point to the destination. Then, the identified recommended route is transmitted to the communication terminal 5 that has given the request. The communication terminal 5 sets the received recommended route as a guidance route, and provides travel guidance in accordance with the guidance route. Thus, even if the map information provided in the communication terminal 5 is map information of an earlier version at the time of route retrieval, an appropriate guidance route can be set based on map information of the latest version that is provided in the server device 3. Particularly in the first embodiment, not only the server device 3 but also the communication terminal 5 executes route retrieval by using the map information provided in the communication terminal 5, and a recommended route retrieved by the communication terminal 5 (hereinafter referred to as a terminal-recommended route) is transmitted to the server device 3 together with the route retrieval request. The server device 3 executes route retrieval by using the terminal-recommended route as described later.

The communication terminal 5 is possessed by the user 4, and an information terminal having a navigation function is used as the communication terminal 5. For example, the communication terminal 5 corresponds to a mobile phone, a smartphone, a tablet terminal, a personal computer, and a navigation device.

The navigation function corresponds to functions of retrieving a route corresponding to conditions specified by the user, displaying a map image around a current position of the user 4, displaying the current position of the user 4 in the displayed map image, and providing travel guidance along the set guidance route. The communication terminal 5 need not have all the features of the navigation function as long as the communication terminal 5 at least has the function of retrieving a route and the function of providing travel guidance along the set guidance route.

The communication network 6 includes a large number of base stations arranged nationwide, and a communication service provider that manages and controls the base stations, and is implemented by connecting the base stations and the communication service provider to each other by wire (such as an optical fiber or ISDN) or by wireless. The base station includes a transceiver (transmitter/receiver) and an antenna for communication with the communication terminal 5. The base station executes wireless communication with the communication service provider, and serves as a terminal of the communication network 6 to relay communication between the server device 3 and the communication terminal 5 located within a range (cell) in which radio waves of the base station are reachable.

Next, the configuration of the server device 3 in the route retrieval system 1 is described in more detail with reference to FIG. 2. As illustrated in FIG. 2, the server device 3 includes a server control ECU 11, a device-side map DB 12 serving as a storage medium connected to the server control ECU 11, and a server-side communication device 13. (As used herein the term "storage medium" is not intended to encompass transitory signals.)

The server control ECU 11 (electronic control unit) is an electronic control unit configured to control the entire server device 3, and includes a CPU 21 serving as a computation device and a control device, and internal storage media such as a RAM 22 to be used as a working memory when the CPU 21 executes various types of arithmetic processing, a ROM 23 configured to store a control program, a route retrieval processing program (see FIG. 4) described later, and the like, and a flash memory 24 configured to store the programs read from the ROM 23. The server control ECU 11 includes various means serving as processing algorithms in cooperation with an ECU of the communication terminal 5 described later. For example, route information acquiring means acquires, when a route retrieval request is acquired from the communication terminal 5, route information related to a target route that is a route corresponding to a predetermined distance from a departure point in a terminal-recommended route that is a route from the departure point to a destination and is retrieved by using the map information provided in the communication terminal 5. Route retrieving means retrieves a route to the destination that includes at least a part of the target route by using the map information provided in the server device 3 and the route information. Route delivering means delivers the route retrieved by the route retrieving means to the communication terminal 5.

The device-side map DB 12 is storage means in which device-side map information 25 that is map information of the latest version and is registered based on data input from the outside or on an input operation is stored while being sectioned in areas (for example, level-10 meshes of 20 km square). The version is creation timing information for identifying a timing when the map information is created. By referring to the version, the timing when the map information is created can be identified.

The device-side snap information 25 basically has the same configuration as that of the map information stored in the communication terminal 5, and is constituted by various types of information necessary for route retrieval, route guidance, and map display as typified by a road network. For example, the device-side map information 25 is constituted by link data related to roads (links), node data related to node points, intersection data related to intersections, location data related to locations such as facilities, map display data to be used for displaying a map, retrieval data to be used for retrieving a route, and search data to be used for searching for a location.

As described later, various types of data to be used for route retrieval processing for retrieving a route from a departure point (for example, a current position of the vehicle) to a set destination are stored as the retrieval data. Examples of the data stored as the retrieval data include cost calculation data to be used for calculating retrieval costs such as a cost indicating a numerical level of appropriateness of a route relative to an intersection (hereinafter referred to as an intersection cost), and a cost indicating a numerical level of appropriateness of a route relative to a link that constitutes a road (hereinafter referred to as a link cost).

In the device-side map DB 12, travel guidance information 26 that is information to be used for identifying a current position and providing simple travel guidance along a guidance route in the communication terminal 5 in association with map information of the latest version is stored separately from the device-side map information 25 while being sectioned in areas (for example, level-13 meshes of 2.5 km square).

The travel guidance information 26 includes matching data necessary for map matching of a current position of the user, guidance data necessary for guidance that prompts the user to move along a guidance route, such as guidance on a right or left turn at a guidance intersection, and display data to be used for displaying a map image and a guidance screen. Examples of the matching data include data to be used for identifying a road shape. Examples of the guidance data include data to be used for identifying the shape of an intersection and a connection relationship between an intersection and a road. The display data includes data to be used for displaying a map image including a road network and a guidance screen for providing travel guidance on a display of the communication terminal 5.

When a route retrieval request is received from the communication terminal 5 as described later, the server control ECU 11 retrieves a route from a departure point to destination by using the device-side map information 25. The server control ECU 11 delivers the retrieved route to the communication terminal 5 that has given the request. The server control ECU 11 also delivers the travel guidance information 26 to the communication terminal 5 as necessary. Specifically, the server control ECU 11 is configured to deliver, to the communication terminal 5, the travel guidance information 26 for a target area that is an area where the communication terminal 5 may move in the future (for example, an area around a current position of the communication terminal 5 or around a guidance route set by the communication terminal 5) and is an area in which the version of the map information provided in the communication terminal 5 is earlier than that of the device-side map information 25.

The server-side communication device 13 is a communication device for communication with the communication terminal 5 via the communication network 6. In addition to the communication with the communication terminal 5, the server-side communication device 13 is capable of receiving traffic information constituted by traffic jam information, traffic control information, traffic accident information, and other information transmitted via the Internet or from a traffic information center such as the Vehicle Information and Communication System (VICS; registered trademark) center or a probe center.

Figure 3:
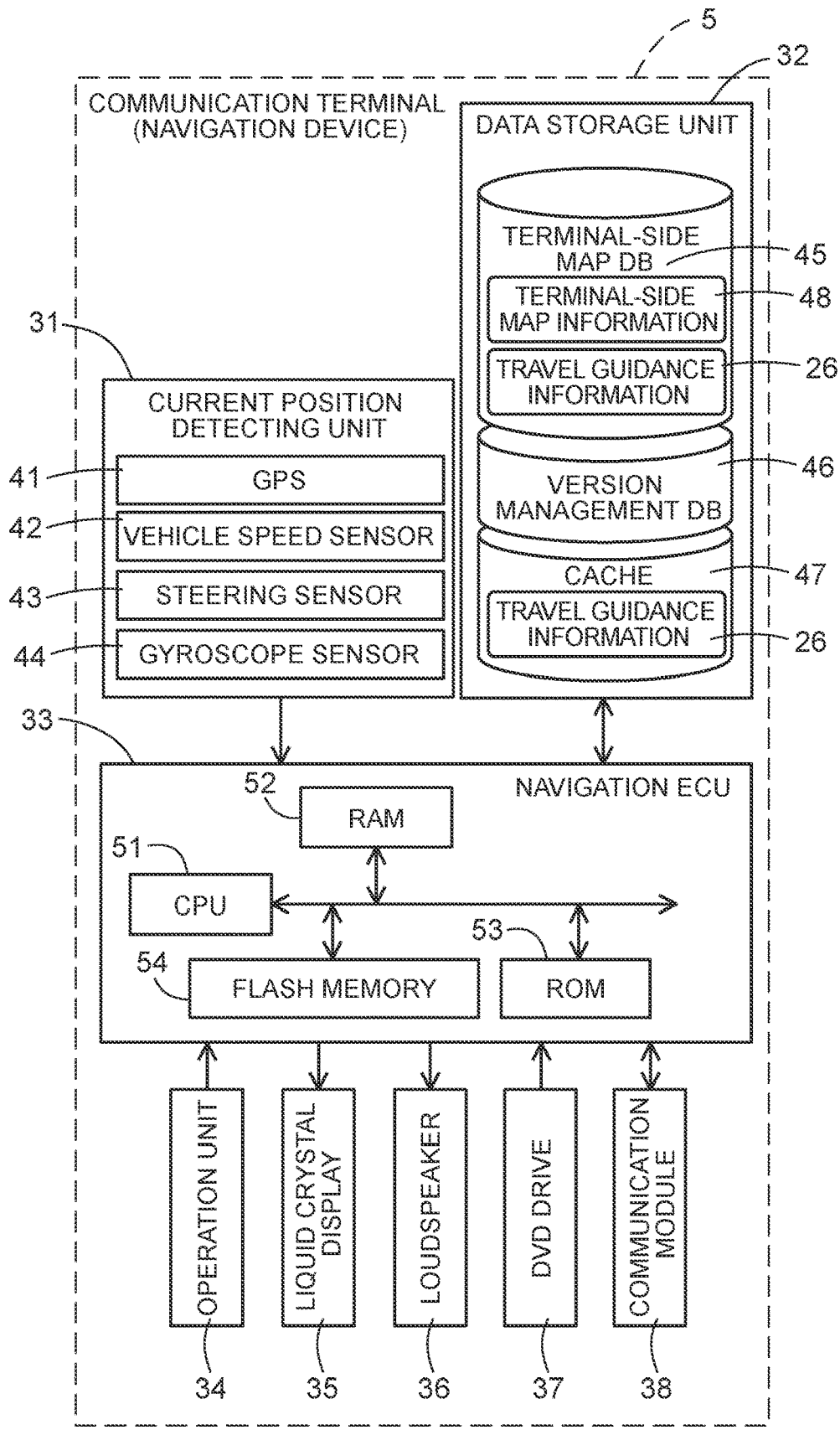
FIG. 3 is a block diagram schematically illustrating a control system of a communication terminal according to the first embodiment.

Next, the schematic configuration of the communication terminal 5 is described with reference to FIG. 3. The following description is given taking an exemplary case where a navigation device mounted on a vehicle is used as the communication terminal 5 and travel guidance is provided particularly for a vehicle as a moving object. A mobile phone, a tablet terminal, a personal computer, or the like may be used instead of the navigation device. When the mobile phone or the tablet terminal is used, travel guidance may be provided for a moving object other than the vehicle (for example, a pedestrian or a bicycle). FIG. 3 is a block diagram schematically illustrating a control system of the navigation device that is the communication terminal 5 according to the first embodiment.

As illustrated in FIG. 3, the communication terminal 5 according to the first embodiment includes a current position detecting unit 31 configured to detect a current position of the vehicle (moving object) equipped with the navigation device that is the communication terminal 5, a data storage unit 32 configured to store various types of data, a navigation ECU 33 configured to execute various types of arithmetic processing based on input information, an operation unit 34 configured to receive an operation from the user, a liquid crystal display 35 configured to display a map and a guidance route to a destination for the user, a loudspeaker 36 configured to output audio guidance related to route guidance, a DVD drive 37 configured to read a DVD that is a storage medium, and a communication module 38 configured to communicate with the server device 3, the VICS center, or the like.

Components that constitute the communication terminal 5 are described below in sequence.

The current position detecting unit 31 includes a GPS 41, a vehicle speed sensor 42, a steering sensor 43, a gyroscope sensor 44, and the like, and is capable of detecting a current position of the vehicle, an azimuth, a traveling speed of the vehicle, a current time, and the like. In particular, the vehicle speed sensor 42 is a sensor for detecting a travel distance and a vehicle speed of the vehicle. The vehicle speed sensor 42 generates a pulse in response to rotation of driving wheels of the vehicle, and outputs a pulse signal to the navigation. ECU 33. The navigation ECU 33 counts the generated pulses to calculate a rotation speed of the driving wheels and a travel distance. The communication terminal 5 need not include all of the four types of sensor. The communication terminal 5 may include one or a plurality of types of sensor out of those sensors.

The data storage unit 32 includes a hard disk (not illustrated) serving as an external storage device and a recording medium, and a recording head (not illustrated) that is a driver for reading a terminal-side map DB 45, a version management DB 46, a cache 47, predetermined programs, and the like that are stored in the hard disk and for writing predetermined data into the hard disk. The data storage unit 32 may be implemented by a memory card or an optical disc such as a CD or a DVD instead of the hard disk.

The terminal-side map DB 45 is storage means for storing terminal-side map information 48 to be used for route retrieval and travel guidance in the communication terminal 5.

Similarly to the device-side map information 25 described above, the terminal-side map information 48 stored in the terminal-side map DB 45 is constituted by various types of information necessary for route retrieval, route guidance, and map display as typified by a road network. For example, the terminal-side map information 48 is constituted by link data related to roads (links), node data related to node points, intersection data related to intersections, location data related to locations such as facilities, map display data to be used for displaying a map, retrieval data to be used for retrieving a route, and search data to be used for searching for a location.

The terminal-side map information 48 stored in the terminal-side map DB 45 is updated to map information of a new version in units of segment (for example, in units of mesh) by rewriting new data over data at a target location based on map update information delivered from an unillustrated map delivering server or map update information acquired from a recording medium. In the terminal-side map DB 45, the travel guidance information 26 to be used for identifying a current position, providing travel guidance along a guidance route, and displaying an image in the communication terminal 5 in association with the map information is also stored while being sectioned in areas (for example, level-13 meshes of 2.5 km square).

The version management DB 46 is storage means in which information for identifying the version of the terminal-side map information 48 currently stored in the terminal-side map DB 45 (for example, a version number and a date of last update) is stored in units of segment (for example, in units of mesh) of the map information. The contents of the version management DB 46 are updated along with updating of the terminal-side map information 48 to map information of a new version.

The cache 47 is storage means for temporarily storing the travel guidance information 26 delivered from the server device 3. In the route retrieval system 1 according to the first embodiment, as described above, the travel guidance information 26 for a target area where the vehicle may travel in the future (for example, an area around a current position of the vehicle or around a guidance route set by the communication terminal 5) and in which the version of the terminal-side map information 48 provided in the communication terminal 5 is earlier than that of the device-side map information 25 is delivered from the server device 3 and stored in the cache 47. As described above, the travel guidance information 26 is information to be used for identifying a current position, providing simple travel guidance along a guidance route, and displaying an image in the communication terminal 5 in association with the latest map information.

In the area in which the version of the terminal-side map information 48 provided in the communication terminal 5 is earlier than that of the device-side map information 25, the navigation ECU 33 identifies a current position of the vehicle, provides travel guidance along a guidance route, and displays an image by using the travel guidance information 26 of a new version that is stored in the cache 47 instead of the map information and the travel guidance information of the earlier versions that are stored in the terminal-side map DB 45. When the storage area of the cache 47 is not sufficient, pieces of the travel guidance information 26 that are stored in the cache 47 and have lower priority levels are deleted in sequence.

The navigation ECU (electronic control unit) 33 is an electronic control unit configured to control the entire communication terminal 5, and includes a CPU 51 serving as a computation device and a control device, and internal storage devices such as a RAM 52 to be used as a working memory when the CPU 51 executes various types of arithmetic processing and configured to store, for example, route data to be used when a route is retrieved, a ROM 53 configured to store a control program, the route retrieval processing program (see FIG. 4) described later, and the like, and a flash memory 54 configured to store the programs read from the ROM 53. The navigation ECU 33 includes various means serving as processing algorithms in cooperation with the ECU of the server device 3. For example, terminal-recommended route retrieving means retrieves a route from a departure point to a destination. Retrieval request transmitting means transmits, to the server device 3, a route retrieval request and route information for identifying a continuous road array from the departure point in a terminal-recommended route that is the route retrieved by the terminal-recommended route retrieving means. Route receiving means receives a route that is retrieved by the server device 3 in response to the route retrieval request.

The operation unit 34 is operated, for example, when inputting a departure point serving as a travel start point and a destination serving as a travel end point, and includes a plurality of operation switches (not illustrated) such as various keys and buttons. The navigation ECU 33 executes control so as to execute various corresponding operations based on switch signals output by, for example, pressing the switches. The operation unit 34 may include a touch panel provided on the front surface of the liquid crystal display 35. The operation unit 34 may include a microphone and a voice recognition device.

The liquid crystal display 35 displays a map image including roads, traffic information, operation guidance, an operation menu, key guidance, a guidance route from a departure point to a destination, guidance information along the guidance route, news, weather forecast, time, email, TV programs, and the like. An HUD or an HMD may be used instead of the liquid crystal display 35.

The loudspeaker 36 outputs audio guidance for providing travel guidance along a guidance route and guidance on traffic information based on instructions from the navigation ECU 33.

The DVD drive 37 is a drive capable of reading data stored in a recording medium such as a DVD or a CD. For example, music and video are reproduced and the terminal-side map DB 45 is updated based on the read data. A card slot for reading and writing a memory card may be provided instead of the DVD drive 37.

The communication module 38 is a communication device for receiving information such as map update information, route information, travel guidance information, or traffic information transmitted from, for example, the server device 3, the VICS (registered trademark) center, or the probe center. For example, the communication module 38 corresponds to a mobile phone or a DCM.

Figure 4:
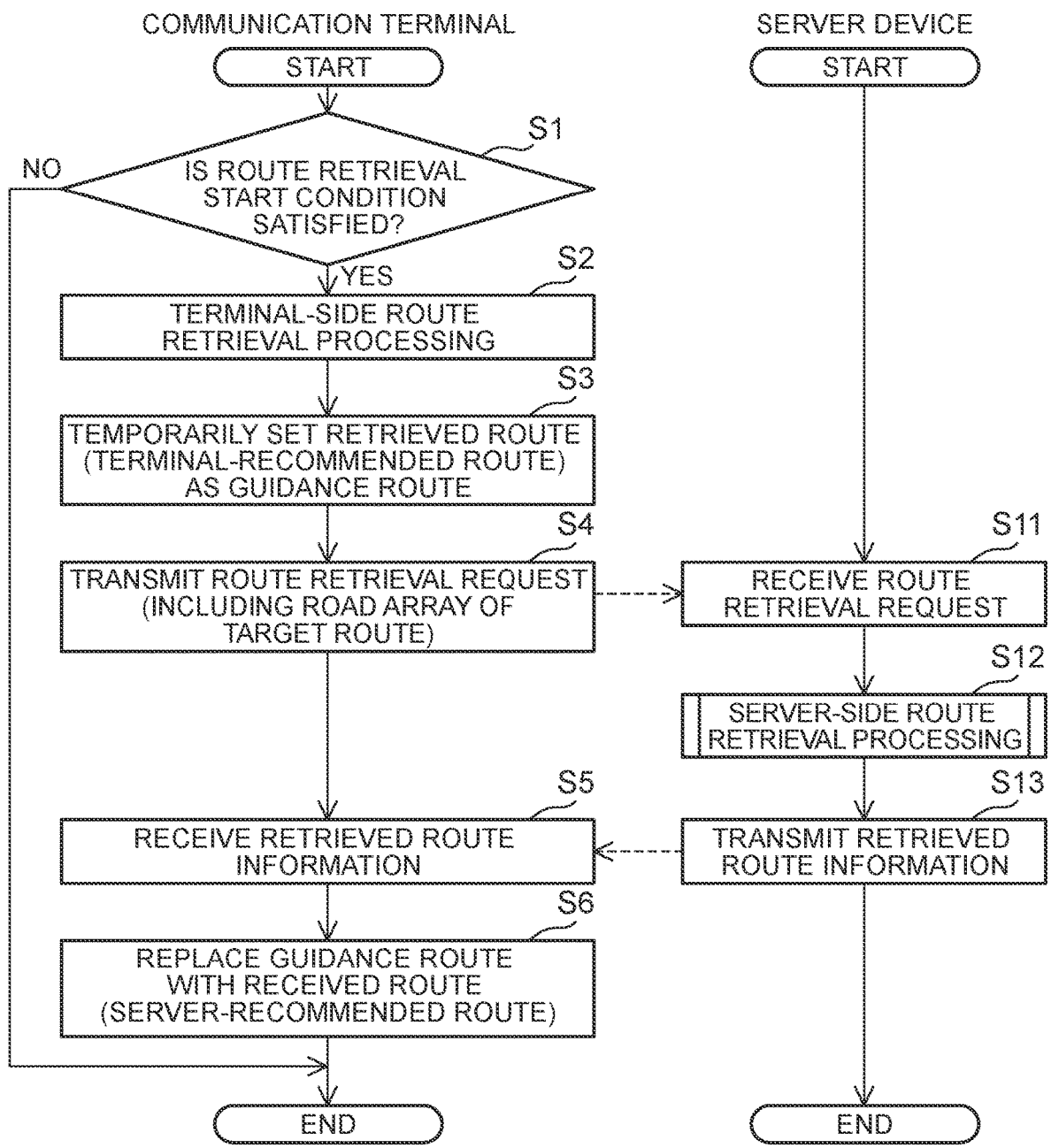
FIG. 4 is a flowchart of a route retrieval processing program according to the first embodiment.

Next, the route retrieval processing program to be executed by the server device 3 and the communication terminal 5 in the route retrieval system 1 having the configuration described above is described with reference to FIG. 4. FIG. 4 is a flowchart of the route retrieval processing program according to the first embodiment. The route retrieval processing program is a program that is executed when a route retrieval start condition is satisfied in the communication terminal 5 (for example, when an operation of setting a destination is received or when the vehicle deviates from a guidance route set by the communication terminal 5) and is configured to retrieve a route from a departure point to a destination by using center route retrieval. The following programs illustrated in the flowcharts of FIG. 4 and FIG. 6 are stored in the RAM or the ROM provided in the server device 3 or the communication terminal 5, and are executed by the CPU 21 or the CPU 51.

First, the route retrieval processing program to be executed by the CPU 51 of the communication terminal 5 is described with reference to FIG. 4. In Step (hereinafter abbreviated as "S") 1, the CPU 51 determines whether the route retrieval start condition is satisfied. The case Where the route retrieval start condition is satisfied corresponds to, for example, a case where an operation of setting a new destination is received in the communication terminal 5 or a case where the vehicle deviates from a guidance route set by the communication terminal 5 (rerouting).

When it is determined that the route retrieval start condition is satisfied (S1: YES), the processing proceeds to S2. When it is determined that the route retrieval start condition is not satisfied (S1: NO), the route retrieval processing program is terminated.

In S2, the CPU 51 executes route retrieval processing from a departure point to a destination by using the terminal-side map information 48 provided in the communication terminal 5 to identify a recommended route from the departure point to the destination (hereinafter referred to as a terminal-recommended route). Specifically, based on the link data, the node data, the retrieval data, and the like included in the terminal-side map information 48, the CPU 51 calculates, for example, a link cost indicating a numerical level of appropriateness of a route relative to a link (road), an intersection cost indicating a numerical level of appropriateness of a route relative to an intersection (node), and a fee cost indicating a numerical level of payment necessary for travel, and retrieves a terminal-recommended route by using the calculated retrieval costs. For example, a route in which the total of the cost values is minimized is set as the terminal-recommended route by using the publicly-known Dijkstra's algorithm. The route retrieval processing using the Dijkstra's algorithm is publicly known, and therefore details are omitted. The departure point may be a current position of the vehicle or a location specified by the user (for example, home). For example, when the vehicle deviates from a guidance route (rerouting), a current position of the vehicle is the departure point.

Next, in S3, the CPU 51 temporarily sets the terminal-recommended route retrieved through the route retrieval processing in S2 as a guidance route that is used for travel guidance for the vehicle in the communication terminal 5. Then, the travel guidance for the vehicle is started based on the guidance route temporarily set in S3. For example, a map image including a road network around the position of the vehicle equipped with the communication terminal 5 is displayed. When the vehicle reaches a predetermined distance from a guidance branch point where a right or left turn may be made, an enlarged view of the guidance branch point is displayed, or guidance is provided on a traveling direction of the vehicle at the guidance branch point. The CPU 51 basically provides the travel guidance based on the terminal-side map information 48 and the travel guidance information 26 that are stored in the terminal-side map DB 45. When the versions of the terminal-side map information 48 and the travel guidance information 26 that are stored in the terminal-side map DB 45 are not the latest versions in an area around the current position of the vehicle, the travel guidance information 26 is acquired from the server device 3, and the travel guidance is provided by using the acquired travel guidance information 26 as well. The travel guidance information 26 includes the matching data necessary for map matching of the vehicle, the guidance data necessary for guidance that prompts the vehicle to travel along a guidance route, such as guidance on a right or left turn at a guidance intersection, and the display data to be used for displaying a map image and a guidance screen. Therefore, even if the terminal-side Map information 48 and the travel guidance information 26 that are stored in the terminal-side map DB 45 are not compatible with the guidance route, guidance can be provided at least in a state in which the current position of the vehicle is identified as a correct position, and guidance can be provided on a correct traveling direction of the vehicle at a guidance intersection.

Next, in S4, the CPU 51 transmits, to the server device 3, a route retrieval request for requesting retrieval of a route from the departure point to the destination. The route retrieval request includes a terminal ID for identifying the communication terminal 5 that has transmitted the route retrieval request, information for identifying the departure point (for example, the current position of the vehicle) and the destination that are route retrieval conditions, and route information for identifying the terminal-recommended route retrieved in S2. When rerouting is executed along with deviation of the vehicle from the guidance route, the destination is basically the same as that of the previous retrieval. Therefore, the information for identifying the destination need not be transmitted.

Information for identifying the entire terminal-recommended route may be transmitted as the route information for identifying the terminal-recommended route. In the first embodiment, however, information for identifying a route corresponding to a predetermined distance L from the departure point (hereinafter referred to as a target route) is transmitted. More specifically, information for identifying a continuous road array included in the target route from the departure point is transmitted. In the first embodiment, the road array is a link array, and a link partially included in the predetermined distance L is included as a transmission target. The link partially included in the predetermined distance L may be excluded from the transmission target.

The predetermined distance L is set based on a current moving speed of the communication terminal 5 (particularly when the communication terminal 5 is a navigation device, the moving speed corresponds to the vehicle speed of the vehicle equipped with the navigation device). Specifically, the communication terminal 5 acquires a current moving speed V by using a sensor such as the vehicle speed sensor 42, and sets a distance obtained by multiplying a predetermined time T by the moving speed V as the predetermined distance L. The predetermined time T is set based on a time from the transmission of the route retrieval request from the communication terminal 5 to the server device 3 to the reception of a route retrieved by the server device 3 from the server device 3. Specifically, considering a case where the communication condition is poor and particularly a case where the destination is located at a long distance away, the predetermined time T is set as a possible longest time that is necessary within the time range from the transmission of the route retrieval request from the communication terminal 5 to the server device 3 to the completion of reception of the route retrieved by the server device 3 from the server device 3. For example, the predetermined time T is 10 seconds. That is, the predetermined distance L is a longest distance by which the communication terminal 5 may move within the time range from the transmission of the route retrieval request from the communication terminal 5 to the server device 3 to the reception of the route retrieved by the server device 3 from the server device 3. The predetermined time T may be an average time instead of the longest time that is necessary within the time range from the transmission of the route retrieval request from the communication terminal 5 to the server device 3 to the completion of reception of the route retrieved by the server device 3 from the server device 3.

Figure 5:
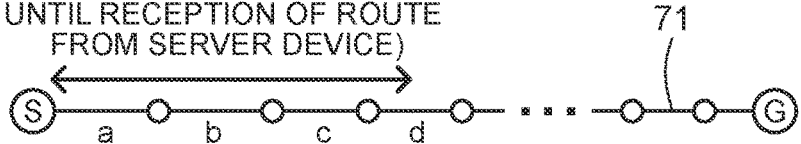
FIG. 5 is a diagram illustrating a terminal-recommended route retrieved by the communication terminal.

For example, when a terminal-recommended route 71 illustrated in FIG. 5 is retrieved in S2, information for identifying continuous links a to d (for example, link IDs) included in the target route within the predetermined distance L from the departure point out of the links that constitute the terminal-recommended route 71 is transmitted to the server device 3 as the route information.

Then, in S5, the CPU 51 receives retrieved route information that is transmitted from the server device 3 in response to the route retrieval request. The retrieved route information received in S5 is information related to a recommended route from the departure point to the destination that is retrieved by the server device 3 by using the device-side map information 25 that is map information of the latest version (hereinafter referred to as a server-recommended route) based on the route retrieval request transmitted in S4. Details of the server-recommended route are described later.

Next, in S6, the CPU 51 replaces the guidance route temporarily set in S3 with the server-recommended route retrieved by the server device 3 based on the retrieved route information received in S5. When the terminal-recommended route and the server-recommended route are the same route, the replacement is not necessary. Then, travel guidance for the vehicle is provided based on the guidance route replaced in S6.

Next, the route retrieval processing program to be executed by the CPU 21 of the server device 3 is described.

First, in S11, the CPU 21 receives the route retrieval request transmitted from the communication terminal 5 in which the route retrieval start condition is satisfied. The route retrieval request includes the terminal ID for identifying the communication terminal 5 that has transmitted the route retrieval request, the information for identifying the departure point (for example, the current position of the vehicle) and the destination that are the route retrieval conditions, and the route information for identifying the terminal-recommended route retrieved in S2.

Next, in S12, the CPU 21 executes server-side route retrieval processing described later (FIG. 6). In the server-side route retrieval processing, as described later, the CPU 21 executes route retrieval processing from the departure point to the destination by using the route retrieval request received in S11 and the device-side map information 25 provided in the server device 3 to identify a recommended route from the departure point to the destination (server-recommended route). The server-recommended route is a route including at least a part of the target route within the predetermined distance from the departure point in the terminal-recommended route retrieved by the communication terminal 5.

Next, in S13, the CPU 21 transmits retrieved route information for identifying the server-recommended route identified in S12 to the communication terminal 5 that has transmitted the route retrieval request. As a result, the server-recommended route is set as the guidance route in the communication terminal 5 (S6).

Next, subordinate processing of the server-side route retrieval processing executed in S12 is described with reference to FIG. 6. FIG. 6 is a flowchart of a subordinate processing program of the server-side route retrieval processing.

The following processing of S21 and S22 is executed in ascending order of the distance from the departure point for the links that constitute the link array of the target route identified by the route information received together with the route retrieval request in S11. As described above, the route information is information for identifying a continuous link array from the departure point (for example, the links a to d in the example illustrated in FIG. 5) within the predetermined distance L from the departure point in the terminal-recommended route.

First, in S21, the CPU 21 determines whether a processing-target link is a link included in the device-side map information 25 provided in the server device 3, that is. Whether a processing-target link is a link present in the map information of the latest version.

When it is determined that the processing-target link is the link included in the device-side map information 25 provided in the server device 3 (S21: YES), that is, the processing-target link is the link present in the map information of the latest version, the processing proceeds to S22. In S22, the CPU 21 stores information for identifying the processing-target link (for example, a link ID) in the flash memory 24 or the like. Then, the CPU 21 executes the processing of S21 and the subsequent processing again after the processing-target link is changed to a link adjacent on the destination side.

When it is determined that the processing-target link is not the link included in the device-side map information 25 provided in the server device 3 (S21: NO), that is, the processing-target link is a link that is not present in the map information of the latest version (such as an abolished road), the processing proceeds to S23.

In S23, the CPU 21 reads, from the flash memory 24 or the like, the link array that is stored in S22 through the determination that the link array is included in the device-side map information 25 up to the current time (by the time when the determination is NO in S21). The read link array is a link array portion that is included in the device-side map information 25 provided in the server device 3 and includes the departure point in the link array identified by the route information received together with the route retrieval request in S11. The link array read in S23 is hereinafter referred to as a reference road array.

For example, when the terminal-recommended route 71 illustrated in FIG. 7 is retrieved in S2 and when the link a, the link b, and the link d are included in the device-side map information 25 but the link c is not included in the device-side map information 25 among the links a to d that are present within the predetermined distance L from the departure point, the link a and the link b that are present on the departure point side with respect to the link c are the reference road array. When the link a that is a link connected to the departure point is not included in the device-side map information 25, it is determined that the reference road array is not present.

Then, in S24, the CPU 21 executes route retrieval processing from an end point of the reference road array to the destination by using the device-side map information 25 provided in the server device 3 to identify a recommended route from the end point of the reference road array to the destination (hereinafter referred to as a continued recommended route). Specifically, based on the link data, the node data, the retrieval data, and the like of the latest version that are included in the device-side map information 25, the CPU 21 calculates, for example, a link cost indicating a numerical level of appropriateness of a route relative to a link (road), an intersection cost indicating a numerical level of appropriateness of a route relative to an intersection (node), and a fee cost indicating a numerical level of payment necessary for travel, and retrieves a continued recommended route by using the calculated retrieval costs. For example, a route in which the total of the cost values is minimized is set as the continued recommended route by using the publicly-known Dijkstra's algorithm. The route retrieval processing using the Dijkstra's algorithm is publicly known, and therefore details are omitted.

In S24, the CPU 21 may retrieve a recommended route from the start point of the reference road array to the destination under a retrieval condition that the route passes through the reference road array, and identify the retrieved route as the continued recommended route.

Next, in S25, the CPU 21 connects the reference road array to the continued recommended route retrieved in S24, and identifies the connected route from the departure point to the destination as a complete server-recommended route. Then, the processing proceeds to S13, and the CPU 21 transmits retrieved route information for identifying the identified server-recommended route to the communication terminal 5 that has transmitted the route retrieval request.

Figure 8:
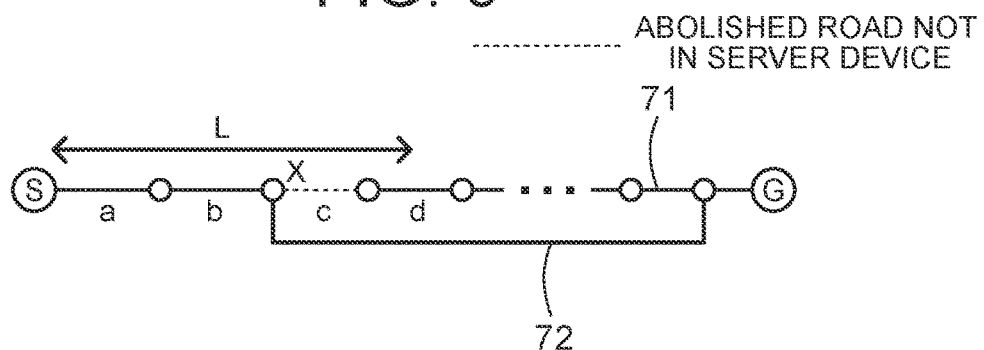
FIG. 8 is a diagram illustrating a server-recommended route retrieved by a server device.

For example, when the terminal-recommended route 71 illustrated in FIG. 8 is retrieved in S2 and when the link a and the link b are the reference road array, a continued recommended route 72 that is a recommended route from an end point X of the link b to the destination is retrieved in S24. A route obtained by connecting the link array of the link a and the link b to the continued recommended route 72 is the server-recommended route. When the reference road array is not present (for example, when the link a that is a link connected to the departure point is not included in the device-side map information 25), a route retrieved through normal route retrieval from the departure point to the destination is set as the server-recommended route.

In S13, the CPU 21 does not necessarily transmit the information for identifying the entire server-recommended route, but may transmit only information for identifying a portion other than the reference road array (that is, the continued recommended route). In this case, the route to the destination can be identified by connecting the continued recommended route transmitted from the server device 3 to the terminal-recommended route retrieved in S2 by the communication terminal 5.

As described above in detail, in the route retrieval system 1, the server device 3, the communication terminal 5, and the computer program to be executed by the server device 3 and the communication terminal 5 according to the first embodiment, when the route retrieval start condition is satisfied, the communication terminal 5 retrieves a route from a departure point to a destination based on the terminal-side map information 48 provided in the communication terminal 5 (S2), and transmits, to the server device 3, a route retrieval request and route information for identifying a continuous link array corresponding to a predetermined distance from the departure point in a terminal-recommended route that is the retrieved route. When the route retrieval request is received, the server device 3 retrieves a route from the departure point to the destination that includes at least a part of the link array identified by the route information (S24, S25), and delivers the retrieved route to the communication terminal 5 (S13). Therefore, the center route can be retrieved also in consideration of the movement of the moving object (such as a vehicle equipped with the communication terminal or a user who carries the communication terminal) after the route retrieval request is given to the server device 3. As a result, a currently optimum guidance route can be set for the moving object.

Second Embodiment

Figure 9:
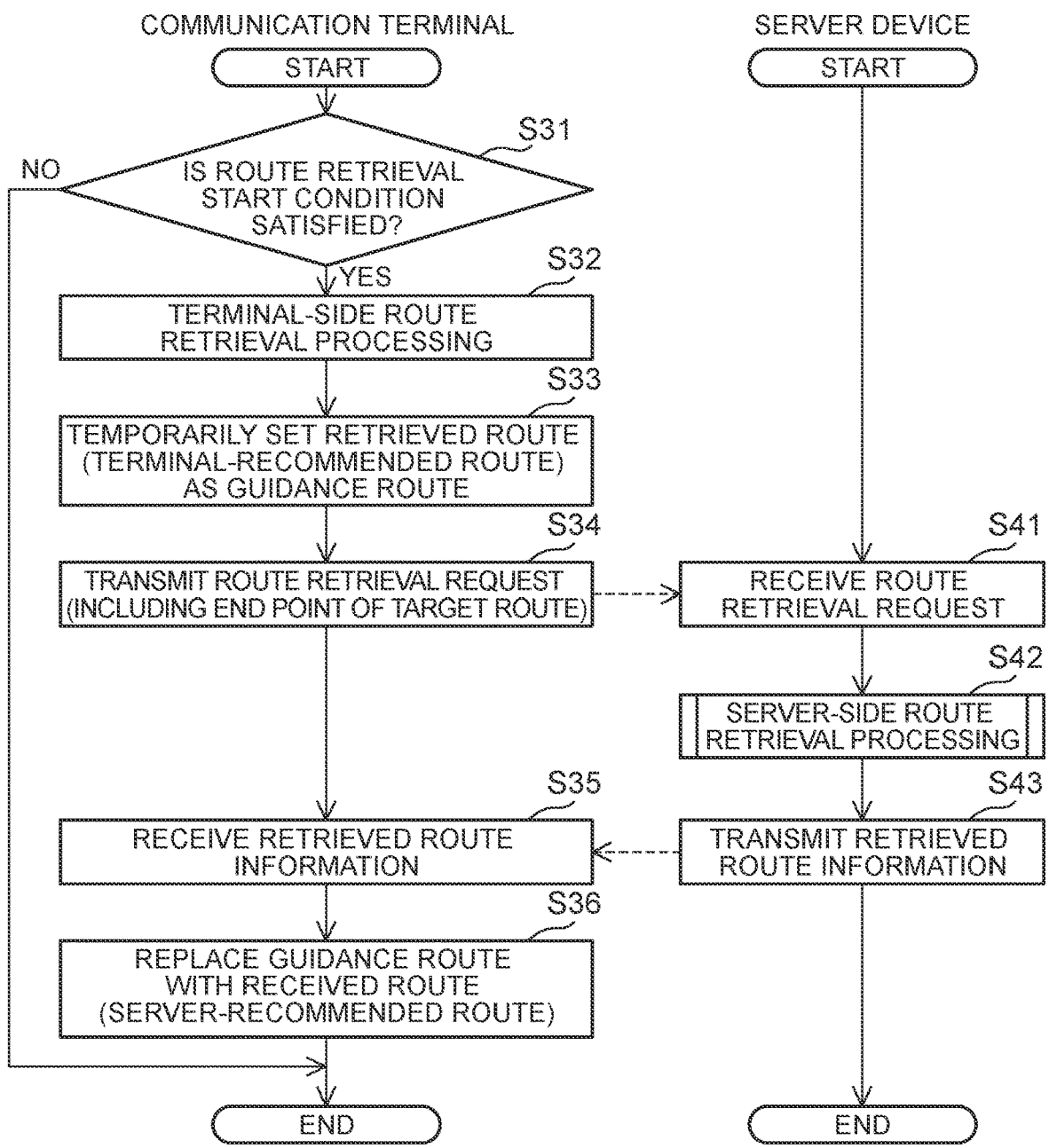
FIG. 9 is a flowchart of a route retrieval processing program according to a second embodiment.

Next, a route retrieval system according to the second embodiment is described with reference to FIG. 9 and FIG. 10. In the following description, the same reference symbols as those of the components of the route retrieval system 1 according to the first embodiment in FIG. 1 to FIG. 8 represent parts that are the same as or correspond to the components of, for example, the route retrieval system 1 according to the first embodiment.

The schematic configuration of the route retrieval system 1 according to the second embodiment is substantially the same as the configuration of the route retrieval system 1 according to the first embodiment. Further, various types of control processing are substantially the same as the control processing of the route retrieval system 1 according to the first embodiment.

In the route retrieval system 1 according to the first embodiment, the information for identifying the road array included in the target route corresponding to the predetermined distance L from the departure point is transmitted as the route information for identifying the terminal-recommended route. The route retrieval system 1 according to the second embodiment is different from the route retrieval system 1 according to the first embodiment in that information for identifying an end point of the target route is transmitted.

A route retrieval processing program to be executed by the server device 3 and the communication terminal 5 in the route retrieval system 1 according to the second embodiment is described below with reference to FIG. 9. FIG. 9 is a flowchart of the route retrieval processing program according to the second embodiment.

First, the route retrieval processing program to be executed by the CPU 51 of the communication terminal 5 is described with reference to FIG. 9. The processing of S31 to S33 is similar to that of S1 to S3 of the route retrieval processing program according to the first embodiment (FIG. 4), and therefore its description is omitted.

In S34, the CPU 51 transmits, to the server device 3, a route retrieval request for requesting retrieval of a route from a departure point to a destination. The route retrieval request includes a terminal ID for identifying the communication terminal 5 that has transmitted the route retrieval request, information for identifying the departure point (for example, a current position of the vehicle) and the destination that are route retrieval conditions, and route information for identifying a terminal-recommended route retrieved in S32. When rerouting is executed along with deviation of the vehicle from a guidance route, the destination is basically the same as that of the previous retrieval. Therefore, the information for identifying the destination need not be transmitted.

Information for identifying the entire terminal-recommended route may be transmitted as the route information for identifying the terminal-recommended route. In the second embodiment, however, information for identifying a target route corresponding to the predetermined distance L from the departure point is transmitted. More specifically, information for identifying the end point of the target route is transmitted.

Similarly to the first embodiment, the predetermined distance L is set based on a current moving speed of the communication terminal 5 (particularly when the communication terminal 5 is a navigation device, the moving speed corresponds to the vehicle speed of the vehicle equipped with the navigation device). Specifically, the communication terminal 5 acquires the current moving speed V by using a sensor such as the vehicle speed sensor 42, and sets a distance obtained by multiplying the predetermined time T by the moving speed V as the predetermined distance L. The predetermined time T is set based on a time from the transmission of the route retrieval request from the communication terminal 5 to the server device 3 to the reception of a route retrieved by the server device 3 from the server device 3. Specifically, considering a case where the communication condition is poor and particularly a case where the destination is located at a long distance away, the predetermined time T is set as a possible longest time that is necessary within the time range from the transmission of the route retrieval request from the communication terminal 5 to the server device 3 to the completion of reception of the route retrieved by the server device 3 from the server device 3. For example, the predetermined time T is 10 seconds. That is, the predetermined distance L is a longest distance by which the communication terminal 5 may move within the time range from the transmission of the route retrieval request from the communication terminal 5 to the server device 3 to the reception of the route retrieved by the server device 3 from the server device 3. The predetermined time T may be an average time instead of the longest time that is necessary within the time range from the transmission of the route retrieval request from the communication terminal 5 to the server device 3 to the completion of reception of the route retrieved by the server device 3 from the server device 3.

Figure 10:
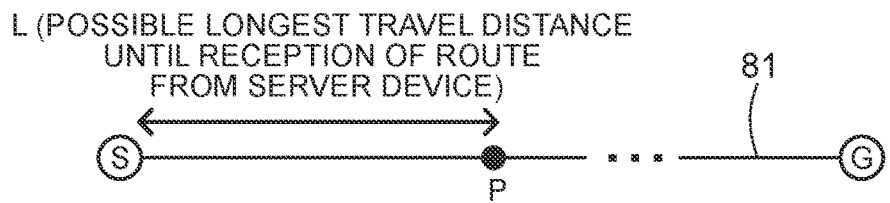
FIG. 10 is a diagram illustrating route information transmitted from the communication terminal to the server device.

For example, when a terminal-recommended route 81 illustrated in FIG. 10 is retrieved in S32, information for identifying a location P (for example, coordinates) that is the predetermined distance L away from the departure point in the terminal-recommended route 81 is transmitted to the server device 3 as the route information.

Then, in S35, the CPU 51 receives retrieved route information that is transmitted from the server device 3 in response to the route retrieval request. The retrieved route information received in S35 is information related to a recommended route from the departure point to the destination that is retrieved by the server device 3 by using the device-side map information 25 that is map information of the latest version (server-recommended route) based on the route retrieval request transmitted in S34.

Next, in S36, the CPU 51 replaces the guidance route temporarily set in S33 with the server-recommended route retrieved by the server device 3 based on the retrieved route information received in S35. When the terminal-recommended route and the server-recommended route are the same route, the replacement is not necessary. Then, travel guidance for the vehicle is provided based on the guidance route replaced in S36.

Next, the route retrieval processing program to be executed by the CPU 21 of the server device 3 is described.

First, in S41, the CPU 21 receives the route retrieval request transmitted from the communication terminal 5 in which the route retrieval start condition is satisfied. The route retrieval request includes the terminal ID for identifying the communication terminal 5 that has transmitted the route retrieval request, the information for identifying the departure point (for example, the current position of the vehicle) and the destination that are the route retrieval conditions, and the route information for identifying the terminal-recommended route retrieved in S32.

Next, in S42, the CPU 21 executes the server-side route retrieval processing described above (FIG. 6). In the second embodiment, only the end point of the target route can be identified on the server device 3 side, and therefore the processing of S21 to S23 is not executed. In S24 and S25, the CPU 21 executes route retrieval processing from the end point of the target route to the destination by using the device-side map information 25 provided in the server device 3, and identifies a recommended route from the end point of the target route to the destination as the server-recommended route. The server-recommended route is a route including at least a part of the target route within the predetermined distance from the departure point in the terminal-recommended route.

Next, in S43, the CPU 21 transmits retrieved route information for identifying the server-recommended route identified in S42 to the communication terminal 5 that has transmitted the route retrieval request. As a result, the route to the destination can be identified by connecting the server-recommended route transmitted from the server device 3 to the terminal-recommended route retrieved in S32 by the communication terminal 5. As a result, the server-recommended route is set as the guidance route in the communication terminal 5 (S6).

As described above in detail, in the route retrieval system 1, the server device 3, the communication terminal 5, and the computer program to be executed by the server device 3 and the communication terminal 5 according to the second embodiment, when the route retrieval start condition is satisfied, the communication terminal 5 retrieves a route from a departure point to a destination based on the terminal-side map information 48 provided in the communication terminal 5 (S32), and transmits, to the server device 3, a route retrieval request and route information for identifying a location that is a predetermined distance away from the departure point in a terminal-recommended route that is the retrieved route. When the route retrieval request is received, the server device 3 retrieves a route to the destination from the location identified by the route information received together with the route retrieval request by using the device-side map information 25, and delivers the retrieved route to the communication terminal 5 (S43). Therefore, when the center route retrieval is executed, the center route can be retrieved also in consideration of the movement of the moving object (such as a vehicle equipped with the communication terminal or a user who carries the communication terminal) after the route retrieval request is given to the server device 3. As a result, a currently optimum guidance route can be set for the moving object. Particularly in the second embodiment, the server device 3 only needs to acquire the end point of the target route from the communication terminal 5, and need not acquire the information for identifying the road array of the target route. Therefore, the communication amount can be reduced, and the time required for the communication terminal 5 to acquire the center route can also be reduced.

Third Embodiment

Figure 11:
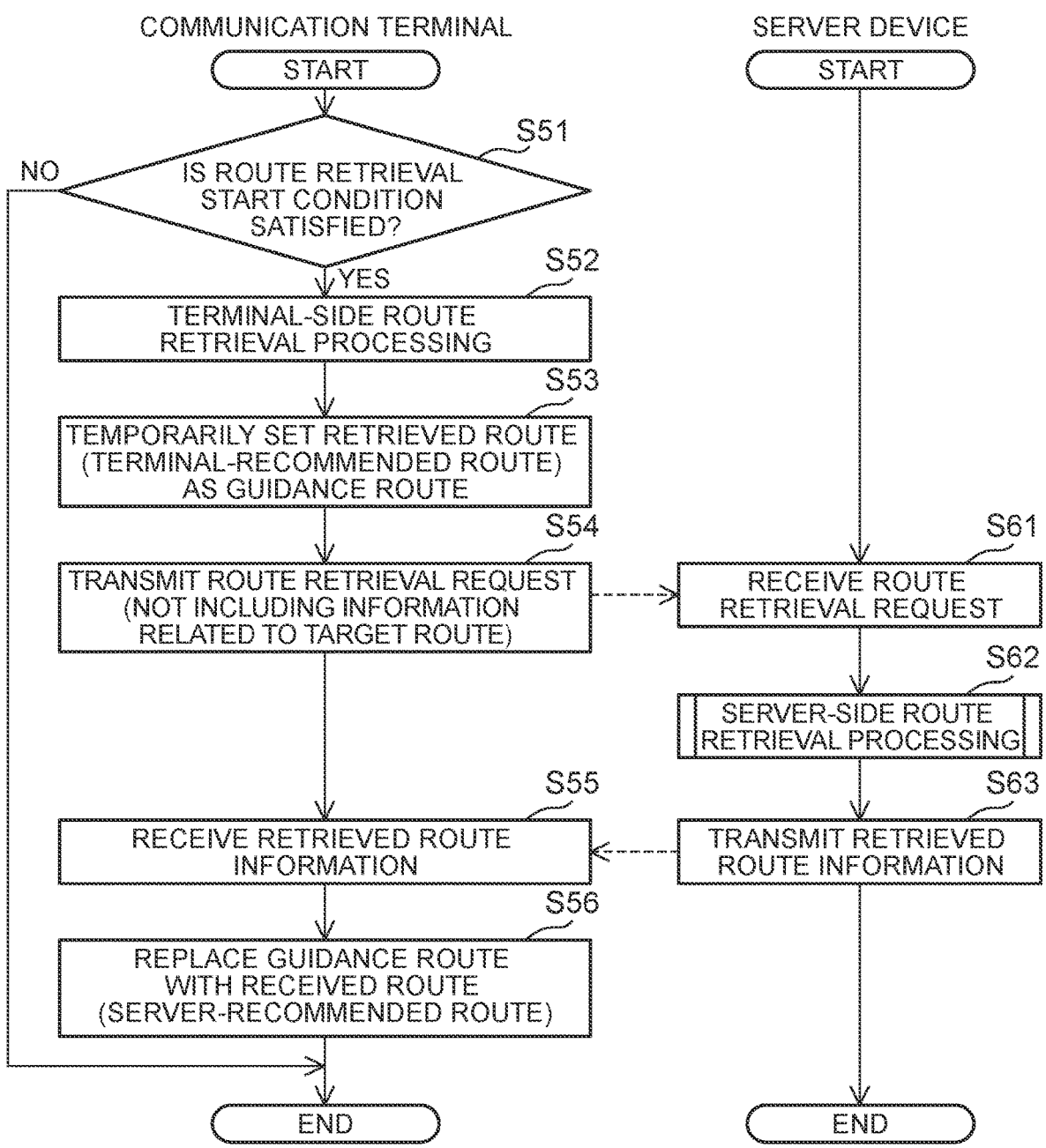
FIG. 11 is a flowchart of a route retrieval processing program according to a third embodiment.

Next, a route retrieval system according to the third embodiment is described with reference to FIG. 11 and FIG. 12. In the following description, the same reference symbols as those of the components of the route retrieval system 1 according to the first embodiment in FIG. 1 to FIG. 8 represent parts that are the same as or correspond to the components of, for example, the route retrieval system 1 according to the first embodiment.

The schematic configuration of the route retrieval system 1 according to the third embodiment is substantially the same as the configuration of the route retrieval system 1 according to the first embodiment. Further, various types of control processing are substantially the same as the control processing of the route retrieval system 1 according to the first embodiment.

In the route retrieval system 1 according to the first embodiment, the route information for identifying the terminal-recommended route is acquired by the server device 3 by being transmitted from the communication terminal 5 to the server device 3. The route retrieval system 1 according to the third embodiment is different from the route retrieval system 1 according to the first embodiment in that the route information is not transmitted from the communication terminal 5 to the server device 3 but the server device 3 acquires the route information by executing route retrieval processing in the server device 3. It is assumed that the device-side map DB 12 of the server device 3 according to the third embodiment stores map information of a previous version in addition to the map information of the latest version (that is, the device-side map information 25) and the server device 3 grasps a current version of the terminal-side map information 48. That is, it is assumed that the server device 3 has substantially the same map information as the terminal-side map information 48 that is currently provided in the communication terminal 5 in addition to the device-side map information 25 that is map information of the latest version.

A route retrieval processing program to be executed by the server device 3 and the communication terminal 5 in the route retrieval system 1 according to the third embodiment is described below with reference to FIG. 11. FIG. 11 is a flowchart of the route retrieval processing program according to the third embodiment.

First, the route retrieval processing program to be executed by the CPU 51 of the communication terminal 5 is described with reference to FIG. 11. The processing of S51 to S53 is similar to that of S1 to S3 of the route retrieval processing program according to the first embodiment (FIG. 4), and therefore its description is omitted.

In S54, the CPU 51 transmits, to the server device 3, a route retrieval request for requesting retrieval of a route from a departure point to a destination. Unlike the first embodiment and the second embodiment, the route retrieval request does not include route information for identifying a terminal-recommended route retrieved in S52.

Then, in S55, the CPU 51 receives retrieved route information that is transmitted from the server device 3 in response to the route retrieval request. The retrieved route information received in S55 is information related to a recommended route from the departure point to the destination that is retrieved by the server device 3 by using the device-side map information 25 that is map information of the latest version (server-recommended route) based on the route retrieval request transmitted in S54.

Next, in S56, the CPU 51 replaces the guidance route temporarily set in S53 with the server-recommended route retrieved by the server device 3 based on the retrieved route information received in S55. When the terminal-recommended route and the server-recommended route are the same route, the replacement is not necessary. Then, travel guidance for the vehicle is provided based on the guidance route replaced in S56.

Next, the route retrieval processing program to be executed by the CPU 21 of the server device 3 is described.

First, in S61, the CPU 21 receives the route retrieval request transmitted from the communication terminal 5 in which the route retrieval start condition is satisfied. The route retrieval request includes a terminal ID for identifying the communication terminal 5 that has transmitted the route retrieval request, and information for identifying the departure point (for example, a current position of the vehicle) and the destination that are route retrieval conditions.

Figure 12:
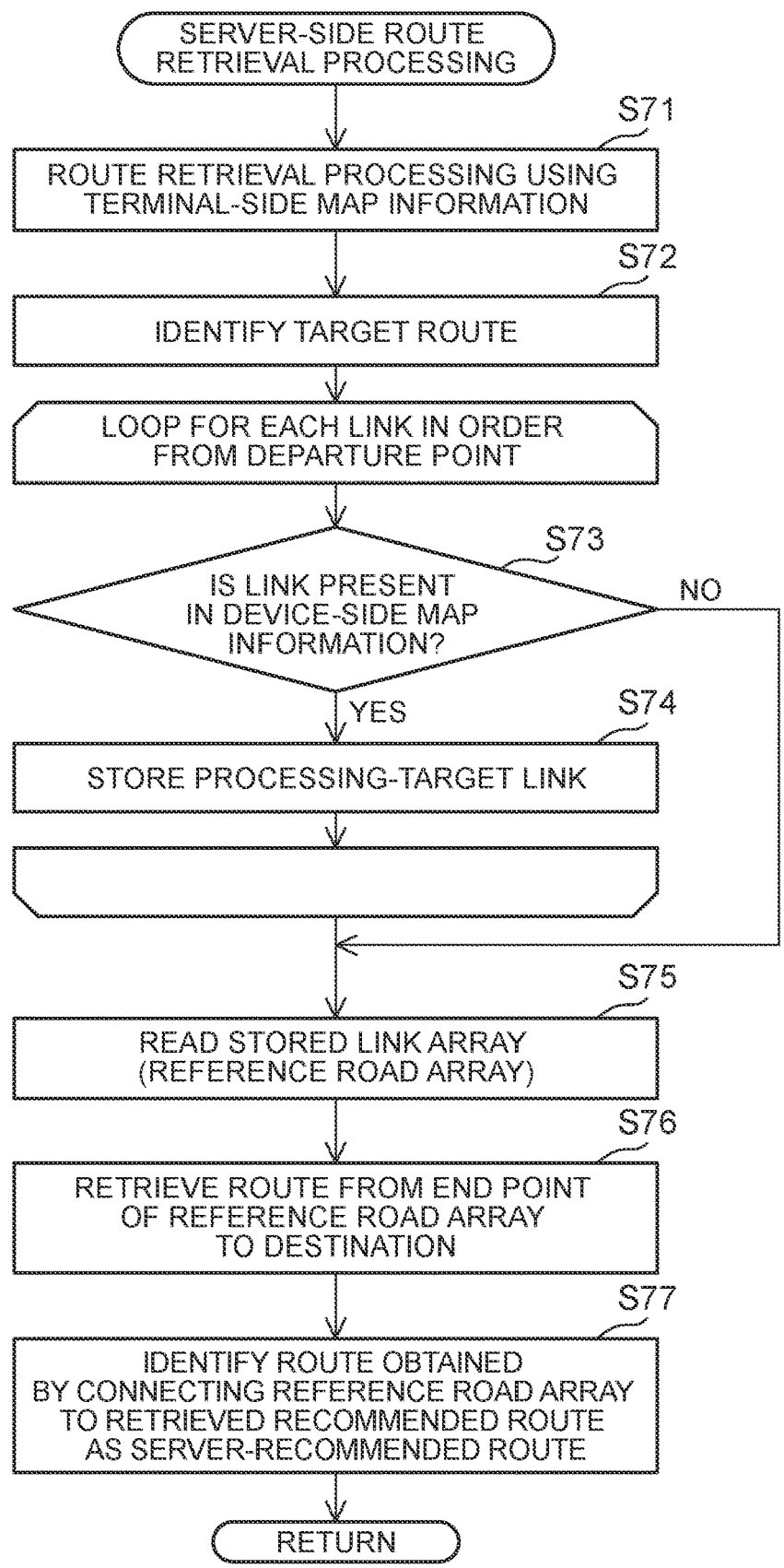
FIG. 12 is a flowchart of a subordinate processing program of server-side route retrieval processing according to the third embodiment.
Figure 13:
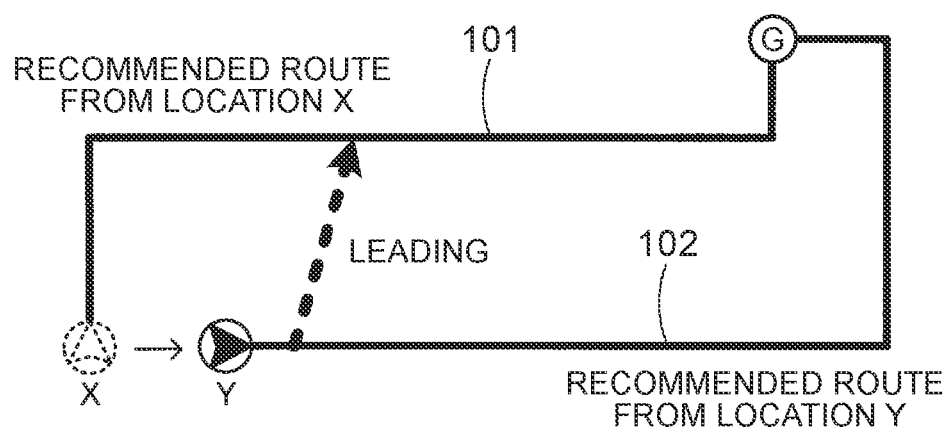
FIG. 13 is a diagram illustrating a problem inherent in related art.

Next, in S62, the CPU 21 executes server-side route retrieval processing described later (FIG. 12). In the server-side route retrieval processing, as described later, the CPU 21 executes route retrieval processing from the departure point to the destination by using the route retrieval request received in S11 and the device-side map information 25 provided in the server device 3 to identify a recommended route from the departure point to the destination (server-recommended route). The server device 3 retrieves a terminal-recommended route by using the terminal-side map information 48 provided in the server device 3, and sets, as the server-recommended route, a route including at least a part of a target route within a predetermined distance from the departure point in the retrieved terminal-recommended route.

Next, in S63, the CPU 21 transmits retrieved route information for identifying the server-recommended route identified in S62 to the communication terminal 5 that has transmitted the route retrieval request. As a result, the server-recommended route is set as the guidance route in the communication terminal 5 (S56).

Next, subordinate processing of the server-side route retrieval processing executed in S62 is described with reference to FIG. 12. FIG. 12 is a flowchart of a subordinate processing program of the server-side route retrieval processing.

First, in S71, the CPU 21 executes route retrieval processing from the departure point to the destination by using the terminal-side map information 48 provided in the server device 3 (when the versions of the terminal-side map information 48 and the device-side map information 25 are the same version, the device-side map information 25 may be used) to identify a recommended route from the departure point to the destination (terminal-recommended route). As described above, the device-side map DB 12 of the server device 3 stores the map information of the previous version in addition to the map information of the latest version (that is, the device-side map information 25), and the server device 3 can identify the terminal-side map information 48 based on the current version of the terminal-side map information 48. The server device 3 acquires information that influences the route retrieval (fir example, traffic information) in addition to the map information similarly to the communication terminal 5. Thus, the route retrieved in S71 is basically the same as the route retrieved in S52. That is, the processing of S71 is processing in which the server device 3 acquires, without communicating with the communication terminal 5, a recommended route that is presumably retrieved when retrieval is executed by using the map information provided in the communication terminal 5.

Next, in S72, the CPU 21 identifies a target route corresponding to the predetermined distance L from the departure point in the terminal-recommended route identified in S71.

The following processing of S73 and S74 is executed in ascending order of the distance from the departure point for links that constitute a link array of the target route identified S72. The subsequent processing of S73 to S77 is similar to that of S21 to S25 of the route retrieval processing program according to the first embodiment (FIG. 6), and therefore its description is omitted. Then, the processing proceeds to S63.

In S63, the CPU 21 transmits retrieved route information for identifying the server-recommended route identified in S73 to S77 to the communication terminal 5 that has transmitted the route retrieval request.

As described above in detail, in the route retrieval system 1, the server device 3, the communication terminal 5, and the computer program to be executed by the server device 3 and the communication terminal 5 according to the third embodiment, when the route retrieval start condition is satisfied, the server device 3 retrieves a route from a departure point to a destination based on the terminal-side map information 48 provided in the communication terminal 5 (S71), retrieves a route from the departure point to the destination that includes at least a part of a continuous link array corresponding to a predetermined distance from the departure point in a terminal-recommended route that is the retrieved route (S76, S77), and delivers the retrieved route to the communication terminal 5 (S63). Therefore, the center route can be retrieved also in consideration of the movement of the moving object (such as a vehicle equipped with the communication terminal or a user who carries the communication terminal) after the route retrieval request is given to the server device 3. As a result, a currently optimum guidance route can be set for the moving object. Particularly in the third embodiment, the server device 3 need not acquire the information related to the terminal-recommended route from the communication terminal 5. Therefore, the communication amount can be reduced greatly, and the time required for the communication terminal 5 to acquire the center route can also be reduced.

It is understood that the embodiments described above need not be limiting and various revisions and modifications may be made without departing from the spirit of the broad inventive principles.

For example, in the first embodiment, the server device 3 executes the processing related to identification of the reference road array in S21 to S23, but the communication terminal 5 may execute the processing. In this case, it is necessary that information for identifying a link that is present in the terminal-side map information 48 but is not present in the device-side map information 25 be provided in the communication terminal 5 or acquired from the server device 3.

In the first embodiment and the third embodiment, the server-recommended route is obtained by retrieving the continued recommended route that is, the recommended route from the end point of the reference road array to the destination (S24, S76) and connecting the reference road array to the continued recommended route. A recommended route to the destination from a point other than the end point of the reference road array (for example, a node present on the departure point side with respect to the end point) may be retrieved as the continued recommended route.

In the first embodiment and the third embodiment, the server device 3 acquires the road array (link array) included in the target route as the route information, but may acquire other information as the route information as long as the information can identify the target route. For example, a coordinate array on the target route may be acquired as the route information.

In the first embodiment and the third embodiment, the reference road array is identified in units of link, but may be identified in units other than the units of link as long as the road is sectioned in the units in the map information.

In the first embodiment to the third embodiment, the communication terminal 5 temporarily sets the terminal-recommended route as the guidance route until the communication terminal 5 receives the server-recommended route from the server device 3 (S3). The temporary setting of the terminal-recommended route as the guidance route need not be executed.

Although the embodiments that implement the server device, the communication terminal, the route retrieval system, and the computer program are described above, the server device may have the following configurations. In those cases, the following effects are attained.

For example, a first configuration is as follows.

The server device (3) is connected to the communication terminal (5) in a bidirectionally communicable manner, and is configured to receive a departure point, a destination, and a route retrieval request from the departure point to the destination from the communication terminal and to deliver a route retrieved in response to the received route retrieval request to the communication terminal. The server device includes the route information acquiring means (11) for acquiring, when the route retrieval request is acquired from the communication terminal, route information related to a target route that is a route corresponding to a predetermined distance from the departure point in the terminal-recommended route (71, 81) that is a route from the departure point to the destination and is retrieved by using the terminal-side map information (48) provided in the communication terminal, the route retrieving means (11) for retrieving a route to the destination that includes at least a part of the target route by using the device-side map information (25) provided in the server device and the route information, and the route delivering means (11) for delivering the route retrieved by the route retrieving means to the communication terminal.

According to the server device having the configuration described above, when the center route retrieval is executed, the center route is set so as to include the route within the predetermined distance from the departure point in the recommended route retrieved by the communication terminal, that is, a route where the moving object (such as a vehicle equipped with the communication terminal or a user who carries the communication terminal) presumably travels after the route retrieval request is transmitted to the server device. Therefore, the center route can be retrieved also in consideration of the movement of the moving object after the route retrieval request is given to the server device. As a result, a currently optimum guidance route can be set for the moving object.

A second configuration is as follows.

The communication terminal (5) retrieves the terminal-recommended route (71, 81), and the route information acquiring means (11) acquires the route information from the communication terminal that retrieves the terminal-recommended route.

According to the server device having the configuration described above, the center route is set so as to include the route within the predetermined distance from the departure point in the recommended route retrieved by the communication terminal, that is, the route where the moving object presumably travels after the route retrieval request is transmitted to the server device. Therefore, the center route can be retrieved also in consideration of the movement of the moving object after the route retrieval request is given to the server device.

A third configuration is as follows.

The server device has the terminal-side map information (48) in addition to the device-side map information (25), and the route information acquiring means (11) retrieves the terminal-recommended route (71, 81) by using the terminal-side map information, and acquires the route information based on the retrieved terminal-recommended route.

According to the server device having the configuration described above, the center route is set so as to include the route within the predetermined distance from the departure point in the recommended route that is presumably retrieved by the communication terminal, that is, the route where the moving object presumably travels after the route retrieval request is transmitted to the server device. Therefore, the center route can be retrieved also in consideration of the movement of the moving object after the route retrieval request is given to the server device. The server device need not acquire the information related to the terminal-recommended route from the communication terminal. Therefore, the communication amount can be reduced greatly, and the time required for the communication terminal to acquire the center route can also be reduced.

A fourth configuration is as follows.

The route information is a road array included in the target route, and the route retrieving means (11) retrieves a route to the destination that passes through at least a part of the road array.

According to the server device having the configuration described above, the center route is set as a route including the road array of the route within the predetermined distance from the departure point in the recommended route retrieved by the communication terminal, that is, the route where the moving object (such as a vehicle equipped with the communication terminal or a user who carries the communication terminal) presumably travels after the route retrieval request is transmitted to the server device. Therefore, the center route can be retrieved also in consideration of the movement of the moving object after the route retrieval request is given to the server device.

A fifth configuration is as follows.

The route information identifies the road array in units of road segment that sections a road in map information.

According to the server device having the configuration described above, the road array can be identified in units of road segment that is used for route retrieval. Therefore, the route to the destination that includes the road array can appropriately be retrieved by using the device-side map information.

A sixth configuration is as follows.

The route identifying means (11) determines, in order from the departure point, whether road segments that constitute the road array identified by the route information are included in the device-side map information (25). When it is determined that a road segment that is not included in the device-side map information is present, the route identifying means retrieves a route to the destination that passes through a road segment determined as being included in the device-side map information by the time when the determination is made.

According to the server device having the configuration described above, by comparing the road segments that constitute the road array identified by the route information to the device-side map information, a road array portion that is included in the device-side map information and includes the departure point in the road array identified by the route information can appropriately be extracted as a road array to be included in the center route.

A seventh configuration is as follows.

The route information is an end point of the target route, and the route retrieving means (11) retrieves a route from the end point of the target route to the destination.

According to the server device having the configuration described above, the center route is set as a route including the end point of the route within the predetermined distance from the departure point in the recommended route retrieved by the communication terminal, that is, the route where the moving object (such as a vehicle equipped with the communication terminal or a user who carries the communication terminal) presumably travels after the route retrieval request is transmitted to the server device. Therefore, the center route can be retrieved also in consideration of the movement of the moving object after the route retrieval request is given to the server device.

An eighth configuration is as follows.

The predetermined distance is a distance based on a moving speed of the communication terminal (5).

According to the server device having the configuration described above, the length of the target route is determined based on the moving speed of the communication terminal. Therefore, the route where the moving object (such as a vehicle equipped with the communication terminal or a user who carries the communication terminal) presumably travels after the route retrieval request is transmitted to the server device can be identified as the target route. Further, the communication amount between the server device and the communication terminal can be minimized without increasing the length of the target route more than necessary.

A ninth configuration is as follows.

The predetermined distance is a distance based on a time from transmission of the route retrieval request from the communication terminal (5) to the server device (3) to reception of the route retrieved by the route retrieving means (11).

According to the server device having the configuration described above, the route where the moving object (such as a vehicle equipped with the communication terminal or a user who carries the communication terminal) presumably travels after the route retrieval request is transmitted to the server device can be identified as the target route. Further, the communication amount between the server device and the communication terminal can be minimized without increasing the length of the target route more than necessary.

A tenth configuration is as follows.

The retrieval request receiving means (11) receives the route retrieval request from the communication terminal (5) when the moving object deviates from a guidance route set by the communication terminal.

According to the server device having the configuration described above, particularly when the moving object deviates from the guidance route, it is possible to prevent the occurrence of a situation in which the travel guidance based on the guidance route is not provided for a long time after the deviation. Even if the map information provided in the communication terminal is map information of an earlier version than that of the map information provided in the server device, it is possible to retrieve again and set an appropriate guidance route without an interruption.

The invention claimed is:

1. A server device connected to a communication terminal in a bidirectionally communicable manner and configured to receive a departure point, a destination, and a route retrieval request from the departure point to the destination from the communication terminal and to deliver a route retrieved in response to the received route retrieval request to the communication terminal, the server device comprising:
a processor programmed to:
acquire, when the route retrieval request is acquired from the communication terminal, route information related to a target route that is a route corresponding to a predetermined distance from the departure point in a terminal-recommended route that is a route from the departure point to the destination and is retrieved by using terminal-side map information provided in the communication terminal;
determine, in order from the departure point, whether road segments that constitute a road array identified by the acquired route information are included in server device-side map information;
retrieve, when it is determined that a road segment that is not included in the server device-side map information is present, a route to the destination that passes through a road segment determined as being included in the server device-side map information by a time when the determination is made, the retrieved route including (i) at least a part of the target route, and (ii) the route to the destination that passes through the road segment determined as being included in the server device-side map information; and
deliver the retrieved route to the communication terminal.

2. The server device according to claim 1, wherein:
the communication terminal retrieves the terminal-recommended route; and the processor is programmed to acquire the route information from the communication terminal that retrieves the terminal-recommended route.

3. The server device according to claim 1, wherein:
the server device has the terminal-side map information in addition to the server device-side map information; and
the processor is programmed to:
  retrieve the terminal-recommended route by using the terminal-side map information; and
  acquire the route information based on the retrieved terminal-recommended route.

4. The server device according to claim 1, wherein:
the route information is a road array included in the target route; and
the processor is programmed to retrieve a route to the destination that passes through at least a part of the road array.

5. The server device according to claim 4, wherein the route information is information for identifying the road array in units of road segment that sections a road in map information.

6. The server device according to claim 1, wherein:
the route information is an end point of the target route; and
the processor is programmed to retrieve a route from the end point of the target route to the destination.

7. The server device according to claim 1, wherein the predetermined distance is a distance based on a moving speed of the communication terminal.

8. The server device according to claim 1, wherein the predetermined distance is a distance based on a time from transmission of the route retrieval request from the communication terminal to the server device to reception of the retrieved route.

9. The server device according to claim 1, wherein the route retrieval request is received from the communication terminal when a moving object deviates from a guidance route set by the communication terminal.

10. A computer-readable storage medium storing a computer-executable program for causing a server device, which is connected to a communication terminal in a bidirectionally communicable manner and is configured to receive a departure point, a destination, and a route retrieval request from the departure point to the destination from the communication terminal and to deliver a route retrieved in response to the received route retrieval request to the communication terminal, to perform functions comprising:
  acquiring, when the route retrieval request is acquired from the communication terminal, route information related to a target route that is a route corresponding to a predetermined distance from the departure point in a terminal-recommended route that is a route from the departure point to the destination and is retrieved by using terminal-side map information provided in the communication terminal;
  determining, in order from the departure point, whether road segments that constitute a road array identified by the acquired route information are included in server device-side map information;
  retrieving, when it is determined that a road segment that is not included in the server device-side map information is present, a route to the destination that passes through a road segment determined as being included in the server device-side map information by a time when the determination is made, the retrieved route including (i) at least a part of the target route, and (ii) the route to the destination that passes through the road segment determined as being included in the server device-side map information; and
  delivering the retrieved route to the communication terminal.

11. A communication terminal connected to a server device in a bidirectionally communicable manner and configured to transmit a departure point, a destination, and a route retrieval request from the departure point to the destination to the server device and to acquire a route that is retrieved and delivered by the server device in response to the route retrieval request, the communication terminal comprising:
  a processor programmed to:
    retrieve a route from the departure point to the destination by using terminal-side map information provided in the communication terminal;
    transmit, to the server device, the route retrieval request and route information related to a target route that is a route corresponding to a predetermined distance from the departure point in a terminal-recommended route that is the retrieved route; and
    receive, from the server device, a route to the destination that includes at least a part of the target route and is retrieved by the server device in response to the route retrieval request by using device-side map information provided in the server device and the route information, the route to the destination having been retrieved by the server by (i) determining, in order from the departure point, whether road segments that constitute a road array identified by the transmitted route information are included in server device-side map information and (ii) retrieving, when it is determined that a road segment that is not included in the server device-side map information is present, a route to the destination that passes through a road segment determined as being included in the server device-side map information by a time when the determination is made, the retrieved route including (i) at least a part of the target route, and (ii) the route to the destination that passes through the road segment determined as being included in the server device-side map information.

12. A route retrieval system, comprising a communication terminal, and a server device connected to the communication terminal in a bidirectionally communicable manner and configured to receive a departure point, a destination, and a route retrieval request from the departure point to the destination from the communication terminal and to deliver a route retrieved in response to the received route retrieval request to the communication terminal, wherein:
  the communication terminal comprises a first processor programmed to:
    retrieve a route from the departure point to the destination by using terminal-side map information provided in the communication terminal;
    transmit, to the server device, the route retrieval request and route information related to a target route that is a route corresponding to a predetermined distance from the departure point in a terminal-recommended route that is the retrieved route; and
    receive, from the server device, a route that is retrieved by the server device in response to the route retrieval request; and
  the server device comprises a second processor programmed to:

receive the route retrieval request and the route information from the communication terminal;
determine, in order from the departure point, whether road segments that constitute a road array identified by the acquired route information are included in server device-side map information;
retrieve, when it is determined that a road segment that is not included in the server device-side map information is present, a route to the destination that passes through a road segment determined as being included in the server device-side map information by a time when the determination is made, the retrieved route including (i) at least a part of the target route, and (ii) the route to the destination that passes through the road segment determined as being included in the server device-side map information; and
deliver the retrieved route to the communication terminal.

* * * * *